United States Patent [19]
Sasaki

[11] Patent Number: 5,976,055
[45] Date of Patent: Nov. 2, 1999

[54] LOCKUP FORCE CONTROL APPARATUS FOR FLUID COUPLING IN VEHICLE WITH AUTOMATIC TRANSMISSION

[75] Inventor: Kazuo Sasaki, Hiroshima, Japan

[73] Assignee: Mazda Motor Corporation, Hiroshima, Japan

[21] Appl. No.: 09/057,987

[22] Filed: Apr. 10, 1998

[30] Foreign Application Priority Data

Apr. 14, 1997 [JP] Japan .................................. 9-111863

[51] Int. Cl.$^6$ .................................................. F16H 61/00
[52] U.S. Cl. ............................................. 477/64; 477/176
[58] Field of Search ................................. 477/901, 168, 477/62

[56] References Cited

U.S. PATENT DOCUMENTS

| | | | |
|---|---|---|---|
| 4,393,467 | 7/1983 | Miki et al. | 364/424.1 |
| 5,434,780 | 7/1995 | Kume et al. | 364/424.1 |
| 5,722,912 | 3/1998 | Narita | 477/64 |
| 5,807,204 | 9/1998 | Shiiba et al. | 477/176 |

FOREIGN PATENT DOCUMENTS

| | | |
|---|---|---|
| 0 533 419 A1 | 3/1993 | European Pat. Off. . |
| 196 34 166 A1 | 2/1997 | Germany . |
| 61-99763 | 5/1986 | Japan . |
| 02212668 | 8/1990 | Japan . |
| 03103665 | 4/1991 | Japan . |

*Primary Examiner*—Dirk Wright
*Attorney, Agent, or Firm*—Staas & Halsey, LLP

[57] ABSTRACT

In a high-load/low-vehicle velocity range that requires a torque-up effect of a torque converter (4) and shock absorption effect during transmission, the converter range is selected, and a lockup clutch (36) is fully released. On the other hand, in a low-load/high-vehicle velocity range that does not so require a shock absorption effect, the lockup range is selected, and the lockup clutch 36 is fully locked up to improve the mileage of an engine (3). Furthermore, in a low-load/low-vehicle velocity range, the slip range is selected, and the slip control for controlling the slip amount of the lockup clutch (36) to converge to a predetermined target slip amount is done, thus balancing between the torque-up effect, shock absorption effect, and the like, and the mileage, and the like.

6 Claims, 7 Drawing Sheets

LOCKUP FORCE CONTROL APPARATUS FOR FLUID COUPLING IN VEHICLE WITH AUTOMATIC TRANSMISSION

BACKGROUND OF THE INVENTION

1. Field of the Invention

The present invention relates to a lockup force control apparatus for a fluid coupling in a vehicle with an automatic transmission.

2. Description of Related Art

In general, an automatic transmission equipped in an automobile is built by combining a torque converter as a kind of fluid coupling, and a transmission gear mechanism, and switches the power transmission route by selectively controlling lockup and release of a plurality of friction elements such as clutches, brakes, and the like that constitute the transmission gear mechanism, thereby automatically changing gears to a desired shift range. In recent years, the torque converter comprises a lockup clutch that directly couples an input element from an engine, and an output element to the transmission gear mechanism.

More specifically, the torque converter comprises a pump (input element) which is coupled to the engine output shaft and rotates together with the engine output shaft, a turbine (output element) disposed to oppose the pump, and a stator interposed between the pump and turbine to increase torque. The torque converter transmits the rotation of the pump to the turbine via hydraulic oil, and outputs the transmitted rotation to the transmission gear mechanism via a turbine shaft coupled to the turbine. In addition to these components, a lockup clutch as a friction element is interposed between the pump and turbine. Upon locking up the lockup clutch, the pump and engine output shaft as the input side of the torque converter are directly coupled to the turbine and turbine shaft as the output shaft, and they can be rotated together.

An automobile equipped with the lockup clutch pre-stores a characteristic map pertaining to the lockup state of the lockup clutch set up with traveling conditions such as the degree of throttle opening, vehicle velocity, and the like as parameters. By substituting the current traveling conditions of the automobile into this characteristic map, the lockup state of the lockup clutch suitable for the current traveling conditions is determined.

For example, when the traveling conditions of the automobile fall within a high-load/low-vehicle velocity range (converter range), since the torque-up effect of the torque converter, the shock absorption effect during transmission, and the like are required, the lockup clutch is fully released, and is set in a converter state (release state). On the other hand, when the traveling conditions fall within a low-load/high-vehicle velocity range (lockup range) that does not so require severe transmission shock absorption effect or the like, the lockup clutch is fully locked up and is set in a lockup state (full lockup state) so as to enhance the power transmission efficiency of the torque converter and to improve the mileage or the like of an engine.

When the traveling conditions of the automobile fall within a low-load/low-vehicle velocity range (slip range), the lockup clutch is set in a slip state so as to balance between the torque-up effect, shock absorption effect, and the like obtained in the converter state and the mileage and the like obtained in the lockup state.

For example, Japanese Patent Laid-Open No. 61-99763 discloses slip control for converging the slip amount of the lockup clutch to a predetermined target slip amount in the slip range. In this slip control, the actual slip amount of the lockup clutch is calculated on the basis of the difference between the engine rotational speed (that of the engine output shaft) and the turbine rotational speed (that of the turbine shaft), and the lockup force of the lockup clutch is feedback-controlled so that the actual slip amount converges to the target slip amount which is set in advance or calculated in correspondence with the traveling conditions at that time.

During the slip control, the lockup clutch is set in the slip state, and the slip amount is controlled to converge to the predetermined target slip amount. Upon examining the torque converter state at that time in terms of the torque-up effect, for example, when the driver has pressed the accelerator pedal and the engine rotational speed has risen, since the actual slip amount deviates in a direction to become larger than the target slip amount, the torque converter state relatively approaches the converter state, and the torque-up effect becomes larger as compared to the case wherein the actual slip amount has converged to the target slip amount. On the other hand, when the actual slip amount has converged to the target slip amount again under the slip control, since the torque converter state relatively approaches the lockup state, the torque-up effect becomes smaller as compared to the case wherein the actual slip amount has deviated in a direction to become larger than the target slip amount. Hence, the driver feels acceleration or deceleration during such control, and recognizes the magnitude of such acceleration or deceleration as drive feeling in correspondence with accelerator pedal operation by driver oneself while the automobile is traveling on a flat road.

When the automobile has reached an upward slope after the flat road and the driver has additionally pressed the accelerator pedal to maintain the current vehicle velocity, the following problem may be posed. More specifically, the engine rotational speed rises in correspondence with the driver's accelerator pedal operation. In addition, since a drive load arising from the upward slope acts on the automobile, the turbine rotational speed drops. Hence, the actual slip amount deviates from the target slip amount beyond the driver's accelerator pedal operation, and the driver feels larger acceleration than the drive feeling that the driver recognized so far in correspondence with accelerator pedal operation by driver oneself on the flat road. Also, when the actual slip amount has converged to the target slip amount under the slip control, the driver feels larger deceleration than the expected drive feeling. When the driver has pressed the accelerator pedal deeper since the driver has felt larger deceleration than the drive feeling of the driver, the traveling conditions shift from the slip range to the converter range, as indicated by an arrow a in FIG. 4, and a larger torque-up effect is given after the shift timing. Hence, the driver feels larger acceleration again, and also feels busy, i.e., unnatural, since larger acceleration and deceleration than those the driver expected frequently repeat themselves.

SUMMARY OF THE INVENTION

The present invention has been made in consideration of the above-mentioned problem, and has as its object to provide a lockup force control apparatus for a fluid coupling in a vehicle with an automatic transmission, which can avoid the driver from feeling busy when the vehicle has reached an upward slope after a flat road.

In order to solve the above problem and to achieve the above object, the present invention comprises the following arrangement. That is, there is provided a lockup force control apparatus for a fluid coupling of a vehicle with an automatic transmission, which comprises a fluid coupling having an input element for receiving engine rotation, an output element which is provided to a input shaft of said automatic transmission, and which is rotated using fluid as a medium upon rotation of the input element, and which transmits the rotation of the input element to a transmission gear mechanism, and a friction element which can lock up the input and output elements, adjustment means for adjusting a lockup force of the friction element of said fluid coupling, traveling condition detection means for detecting a traveling condition of a vehicle, lockup state selection means for selecting a lockup state of the friction element from a full lockup state, slip state, and release state on the basis of a lockup state characteristic of the friction element, which is set in advance in accordance with the traveling condition, and the detection result of said traveling condition detection means, and control means for controlling said adjustment means to realize the lockup state of the friction element selected by said lockup state selection means, said apparatus further comprising, road gradient detection means for detecting a gradient of a road the vehicle is traveling, and lockup state change means for, when said road gradient detection means detects an upward gradient not less than a first predetermined value, controlling said control means to set the friction element in the release state irrespective of the selection result of said lockup state selection means.

In the present invention, even when the upward gradient not less than the first predetermined value has been detected, when the lockup state selection means selects the full lockup state as the lockup state of the friction element, the lockup state change means controls the control means to maintain the friction element in the full lockup state.

Also, in the present invention, even when said lockup state selection means has selected the full lockup state as the lockup state of the friction element, when a gear position of said transmission gear mechanism is shifted down upon depression of an accelerator pedal by a driver, said lockup state change means controls said control means to set the friction element in the release state.

Furthermore, in the present invention, even when the lockup state selection means has selected the full lockup state as the lockup state of the friction element, when the road gradient detection means detects an upward gradient not less than a second predetermined value larger than the first predetermined value, the lockup. state change means controls the control means to set the friction element in the release state.

Also, in order to solve the above problem and to achieve the above object, the present invention comprises the following arrangement. That is, there is provided a lockup force control apparatus for a fluid coupling of a vehicle with an automatic transmission, comprising a torque converter comprising a pump coupled to an output shaft of an engine, and a turbine coupled to an input shaft of a transmission gear mechanism, a lockup clutch which can lock up the pump and turbine, a release chamber which is adapted to release the lockup clutch upon reception of hydraulic oil, a lockup chamber which is adapted to lock up the lockup clutch upon reception of hydraulic oil, a solenoid valve for adjusting the hydraulic oil to be supplied to the release and lockup chambers, an engine rotational speed sensor for detecting a rotational speed of the engine, a throttle opening degree sensor for detecting a throttle opening degree of the engine, a turbine rotational speed sensor for detecting a rotational speed of the input shaft of the transmission gear mechanism, an output shaft rotational speed sensor for detecting a rotational speed of an output shaft of the transmission gear mechanism, and a control unit for controlling the solenoid valve using detection signals supplied from the engine rotational speed sensor, throttle opening degree sensor, turbine rotational speed sensor, and output shaft rotational speed sensor, wherein the control unit has a lockup state characteristic map of the lockup clutch using a vehicle velocity and the throttle opening degree as parameters, controls the solenoid valve to realize a lockup state of the lockup clutch determined on the basis of the characteristic map, the vehicle velocity calculated based on a detection value of the turbine rotational speed sensor, and a detection value of the throttle opening degree sensor, calculates a gradient of a road the vehicle is traveling on the basis of a turbine torque calculated based on the engine rotational speed, throttle opening degree, and turbine rotational speed, a gear ratio calculated based on the turbine rotational speed and output shaft rotational speed, and the vehicle velocity calculated based on the output shaft rotational speed, and controls the solenoid valve to release the lockup clutch irrespective of the lockup state determined by the characteristic map when a gradient of the road the vehicle is traveling is an upward gradient not less than a first value.

In the present invention, even when the upward gradient not less than the first predetermined value has been detected, when the full lockup state is selected as the lockup state of the lockup clutch, said control unit controls said solenoid valve to maintain the lockup clutch in the full lockup state.

Also, in the present invention, even when the full lockup state is selected as the lockup state of the lockup clutch, when a gear position of said transmission gear mechanism is shifted down upon depression of an accelerator pedal by a driver, said control unit controls said solenoid valve to set the lockup clutch in the release state.

Further, in the present invention, even when the full lockup state is selected as the lockup state of the lockup clutch, when it is detected that an upward gradient is not less than a second predetermined value larger than the first predetermined value, said control unit controls said solenoid valve to set the lockup clutch in the release state.

According to the present invention, the apparatus comprises the road gradient detection means for detecting the gradient of the road the vehicle is traveling. When the road gradient detection means detects an upward gradient equal to or larger than the first value, the lockup state change means fully releases the lockup clutch independently of the lockup state of the lockup clutch determined by the lockup state determination means.

For example, when the vehicle has reached an upward slope during the slip control, since the slip control is interrupted, the slip amount of the lockup clutch that has deviated from the target slip amount is not controlled to converge to the target slip amount. As a result, the driver can be prevented from repetitively feeling larger acceleration and deceleration than those the driver expected.

In this case, when the converter state is set by releasing the lockup clutch, a torque-up effect can be obtained, and acceleration that can cope with the upward gradient can be obtained.

On the other hand, when the vehicle has reached an upward slope in the lockup state, the lockup clutch is not released but is kept in the lockup state. More specifically, since the lockup state is set in the low-load/high-vehicle velocity range, the slit amount is relatively small even when the lockup clutch is released in this state. Also, since the rotation ratio of the output element to the input element is nearly unity, a large torque-up effect cannot be obtained. Hence, the lockup state is maintained while placing an importance on the mileage.

Furthermore, when the driver has pressed the accelerator pedal and the gear position has been shifted down, or when an upward gradient equal to or larger than the second value larger than the first value is detected, the lockup clutch is released. That is, in such case, since the driver requires acceleration, or since the vehicle is going up a steeper slope, a larger torque-up effect is obtained by releasing the lockup clutch.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

The embodiment of the present invention will be described in detail hereinafter with reference to the accompanying drawings.

Figure 1:
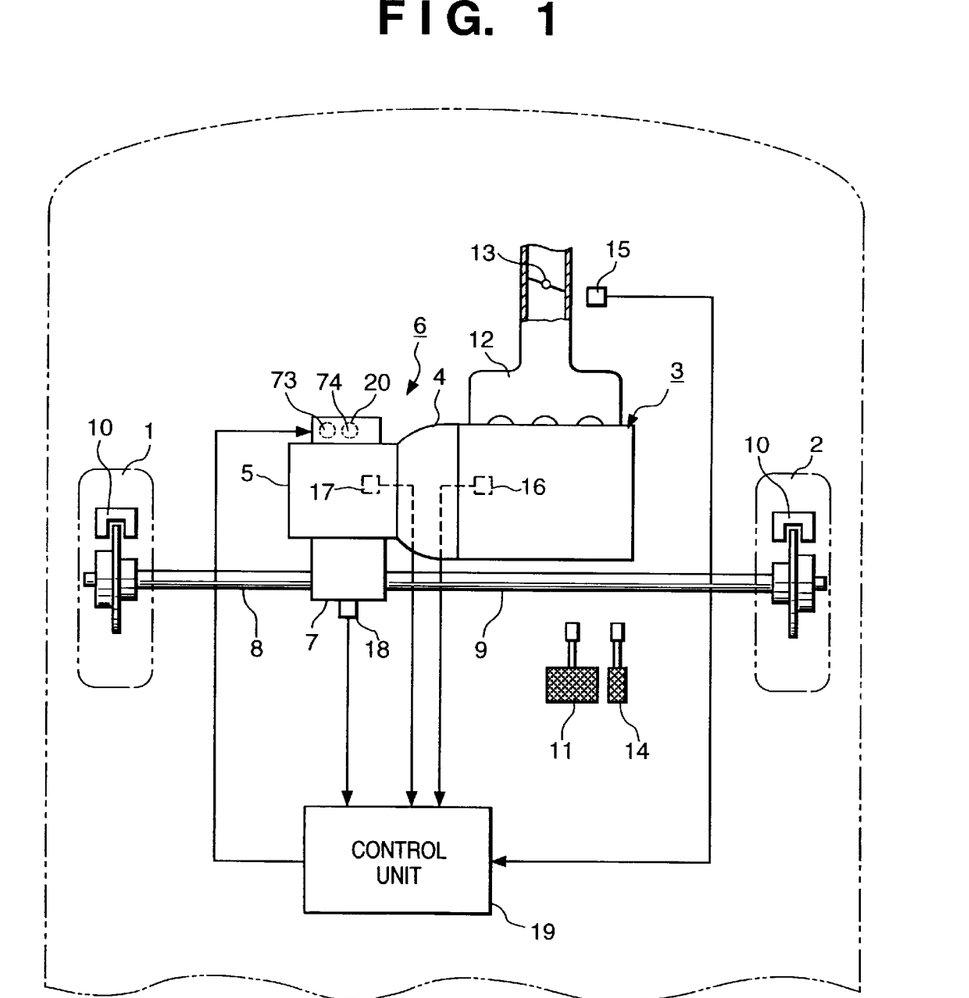
FIG. 1 is a control block diagram of a vehicle according to an embodiment of the present invention.

As shown in FIG. 1, a vehicle of this embodiment is a front-engine, front-drive vehicle which has right and left front wheels 2 and 1 serving as driving wheels, and right and left rear wheels (not shown) serving as driven wheels, and the output from an engine 3 is transmitted from an automatic transmission 6 as a combination of a torque converter 4 and a transmission gear mechanism 5 to the right and left front wheels 2 and 1 via right and left drive shafts 9 and 8. Each wheel is equipped with a brake device 10, and rotation of each wheel is braked upon depression of a brake pedal 11. Also, a throttle valve 13 is disposed at an intake path 12 of the engine 3, and the opening degree of the throttle valve 13 is adjusted in correspondence with depression of an accelerator pedal 14, thereby variably controlling the intake air amount and adjusting the engine output.

The vehicle comprises a control unit 19 which receives signals from a throttle opening degree sensor 15 for detecting the opening degree of the throttle valve 13, an engine rotational speed sensor 16 for detecting the rotational speed of the output shaft of the engine 3 (the input shaft of the torque converter 4), a turbine rotational speed sensor 17 for detecting the rotational speed of a turbine shaft (the output shaft of the torque converter 4 and the input shaft of the transmission gear mechanism 5), an output rotational speed sensor 18 for detecting the rotational speed of the output shaft of the transmission gear mechanism 5, and the like, and implements control of the engine 3, transmission control via a transmission unit 20 equipped in the automatic transmission 6, and lockup control of a lockup clutch of the torque converter 4 via solenoid valves 73 and 74 (to be described later) on the basis of these signals.

Figure 2:
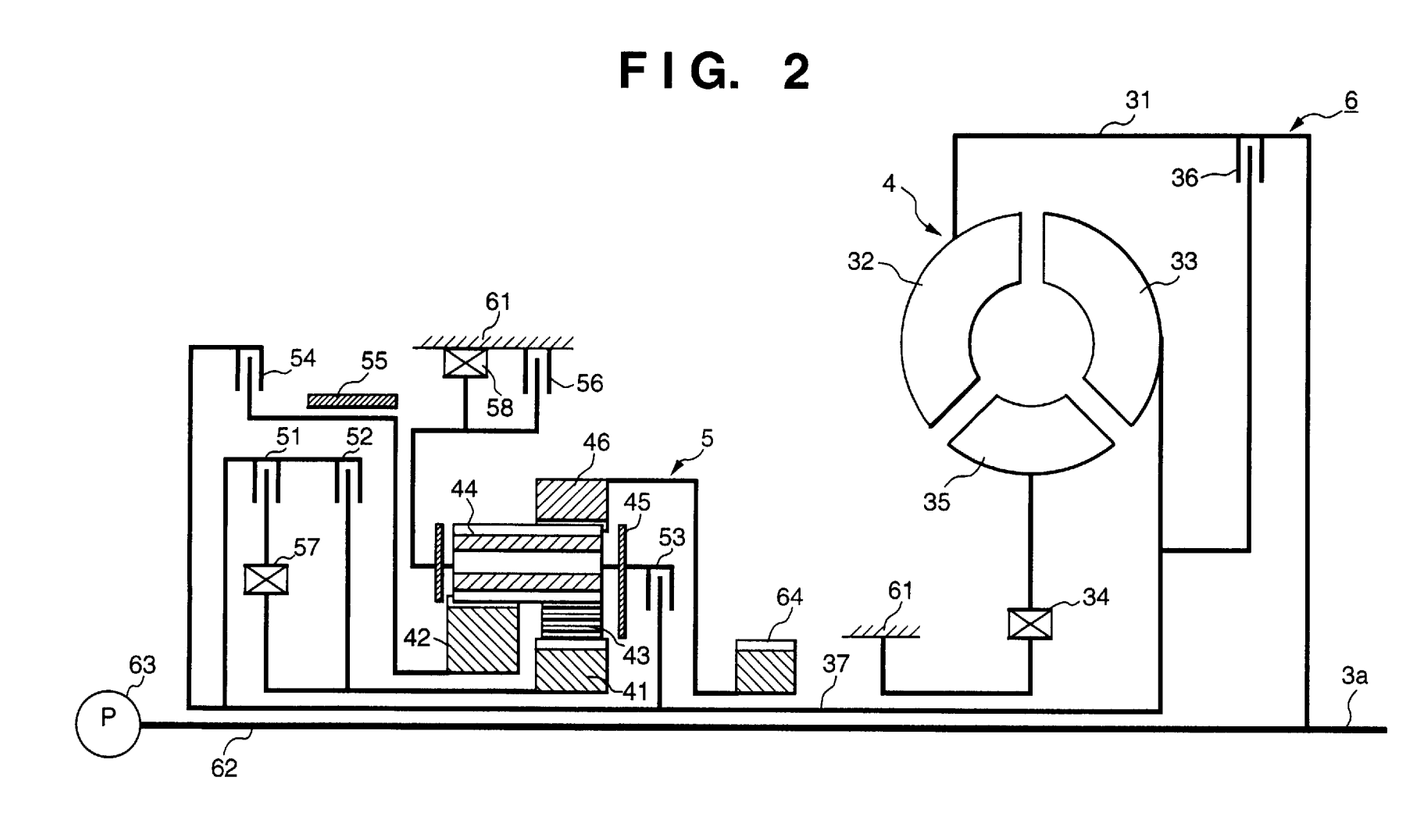
FIG. 2 is a skeleton view showing the arrangement of an automatic transmission shown in FIG. 1.

The mechanical arrangement of the automatic transmission 6 will be explained below with reference to FIG. 2.

The automatic transmission 6 has the torque converter 4 coupled to an output shaft 3a of the engine 3, the transmission gear mechanism 5 which receives the output torque (turbine torque) of the torque converter 4, a plurality of friction elements 51 to 56 including clutches, brakes, and the like for switching the power transmission route of the transmission gear mechanism 5, and one-way clutches 57 and 58. When the transmission unit 20 shown in FIG. 1 selectively supplies a line pressure to the friction elements 51 to 56, the transmission ratio (shift range) of the transmission gear mechanism 5 is switched, thus obtaining D, S, L, and R ranges as traveling ranges, the 1st to 4th speeds in the D range, the 1st to 3rd speeds in the S range, and the 1st and 2nd speeds in the L range.

Figure 3:
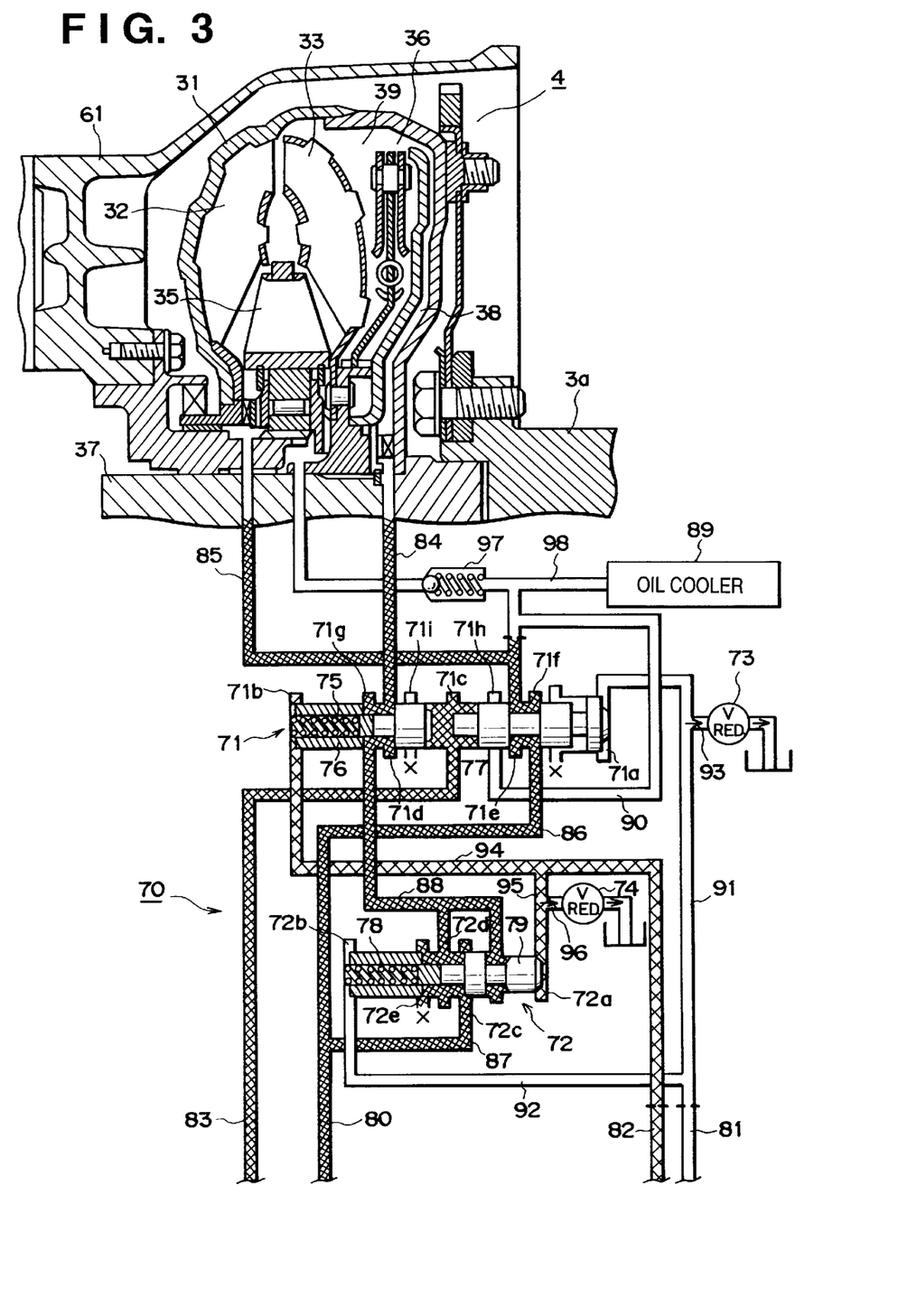
FIG. 3 is a diagram showing a control hydraulic pressure circuit for controlling a lockup clutch.

As shown in FIG. 3 as well, the torque converter 4 has a pump 32 which is fixed at a position opposite to the engine in a case 31 coupled to the engine output shaft 3a, and rotates together with the engine output shaft 3a, a turbine 33 which is rotatably disposed on the engine side in the case 31 to oppose the pump 32, and is rotated via hydraulic oil upon rotation of the pump 32, a stator 35 which is interposed between the pump 32 and turbine 33, and is supported by a transmission case 61 via a one-way clutch 34 to give a torque-up effect, and a lockup clutch 36 which is interposed between the case 31 and turbine 33, and directly couples the engine output shaft 3a and turbine 33 via the case 31.

The rotation of the turbine 33 is output toward the transmission gear mechanism 5 side via a turbine shaft 37, and the lockup clutch 36 is coupled to the turbine shaft 37. The working pressure which is supplied to/released from a space (release chamber) 38 on the engine side of the lockup clutch 36 and a space (lockup chamber) 39 on the side opposite to the engine is controlled by a control hydraulic pressure circuit 70. When the lockup clutch 36 is locked up to the case 31, the engine output shaft 3a and turbine shaft 37 are directly coupled to each other via the case 31.

The engine output shaft 3a is coupled to a pump shaft 62 that extends through the turbine shaft 37, and the shaft 62 drives an oil pump 63 equipped at that end portion of the transmission 6 which is opposite to the engine.

On the other hand, the transmission gear mechanism 5 comprises a rack & pinion type planetary gear device, and is constituted by a small-diameter small sun gear 41 which freely fits on the turbine shaft 37, a large-diameter large sun gear 42 which freely fits on the turbine shaft 37 at a position opposite to the sun gear 41 with respect to the engine, a plurality of short pinion gears 43 which mesh with the small sun gear 41, a long pinion gear 44, the portion on the engine side of which meshes with the short pinion gear 43, and the portion opposite to the engine of which meshes with the large sun gear 42, a carrier 45 which rotatably supports the long and short pinion gears 44 and 43, and an internal gear 46 which meshes with the long pinion gear 44.

A forward clutch 51 and a first one-way clutch 57 are serially interposed between the turbine shaft 37 and small sun gear 41, and a coaster clutch 52 is interposed to be parallel to these clutches 51 and 57. In addition, a 3–4 clutch is interposed between the turbine shaft 37 and carrier 45, and a reverse clutch 54 between the turbine shaft 37 and large sun gear 42. Furthermore, a 2–4 brake 55 as a band brake for fixing the large sun gear is inserted between the large sun gear 42 and reverse clutch 54, and a second one-way clutch 58 for receiving the counterforce of the carrier 45 and a low reverse brake 56 for fixing the carrier 45 are parallelly interposed between the carrier 45 and transmission case 61. The internal gear 46 is coupled to an output gear 64, and rotation is transmitted from the output gear 64 to the right and left front wheels 2 and 1 via a differential device 7 and the drive shafts 8 and 9 shown in FIG. 1.

Table 1 below summarizes the relationship between the actuation states of the friction elements 51 to 56 including clutches, brakes and the like, and the one-way clutches 57 and 58, and the shift ranges. Note that O marks in Table 1 indicate the lockup state for the friction elements 51 to 56, and the lock state for the one-way clutches 57 and 58.

The control unit 19 determines the shift range on the basis of the detection signals from the turbine rotational speed sensor 17 and throttle opening degree sensor 15, and outputs a transmission signal (shift-up or shift-down signal) corresponding to the determined shift range to the transmission unit 20, thereby attaining transmission by changing the actuation states of the friction elements 51 to 56.

75, and a second spool 77 disposed at the right end of the first spool 76, and the control valve 72 comprises a spool 79 biased to the right by a spring 78.

The hydraulic pressure circuit 70 has a torque converter line 80 for receiving a line pressure output from a pressure regulator valve (not shown), a first pilot line for supplying the first pilot pressure, a second pilot line 82 for supplying the second pilot pressure, a constant pressure line 83 for supplying a constant pressure to an intermediate port 72c of the shift valve 71, a release pressure line 84 for connecting a port (release pressure port) 71d of the shift valve 71 and the release chamber 38 of the torque converter 4, and a lockup pressure line 85 for connecting a port (lockup pressure port) 71e of the shift valve 71 to the lockup chamber 39 of the torque converter 4.

The torque converter line 80 branches into a line 86 connected to a port 71f of the shift valve 71, and the port 72c of the control valve 72, and a port 72d which neighbors the port 72c of the control valve 72 is connected to a port 71g of the shift valve 71 via a line 88. Also, a port 71h of the shift valve 71 is connected to a line 90 that communicates with an oil cooler 89.

The first pilot line 81 branches into a line 91 connected to the pilot port 71a at the right end portion of the shift valve 71, and a line 92 connected to the pilot port 72b at the left end portion of the control valve 72, and the ON/OFF solenoid valve 73 is disposed at a drain line 93 that further branches from the line 91. When the solenoid valve 73 is OFF, the drain line 93 is closed; when the valve 73 is ON, the line 93 is opened.

TABLE 1

| Range | | Forward Clutch (51) | Coaster Clutch (52) | 3–4 Clutch (53) | Reverse Clutch (54) | 2–4 Brake (55) | Low Reverse Brake (56 | One-way Clutch First (57) | One-way Clutch Second (58) |
|---|---|---|---|---|---|---|---|---|---|
| P | | | | | | | | | |
| R | | | | | ○ | | ○ | | |
| N | | | | | | | | | |
| D | 1st | ○ | | | | | | ○ | ○ |
|   | 2nd | ○ | | | | ○ | | ○ | |
|   | 3rd | ○ | ○ | ○ | | | | ○ | |
|   | 4th | ○ | | ○ | | ○ | | | |
| S | 1st | ○ | | | | | | ○ | ○ |
|   | 2nd | ○ | ○ | | | ○ | | ○ | |
|   | 3rd | ○ | ○ | ○ | | | | ○ | |
| L | 1st | ○ | ○ | | | | ○ | ○ | ○ |
|   | 2nd | ○ | ○ | | | ○ | | ○ | |

The control hydraulic pressure circuit 70 of the torque converter 4 will be explained below with reference to FIG. 3.

The torque converter control hydraulic pressure circuit 70 comprises a shift valve 71 for switching the working pressure supply route, a control valve 72 for adjusting the working pressure supplied to the release chamber 38 of the torque converter 4 via the shift valve 71, an ON/OFF solenoid valve 73 for ON/OFF-controlling a first pilot pressure to be supplied to a pilot port 71a at the right end portion (FIG. 3) of the shift valve 71 and a pilot port 72b at the left end portion of the control valve 72, and the duty solenoid valve 74 for duty-controlling a second pilot pressure to be supplied to a pilot port 71b at the left end portion of the shift valve 71 and a pilot port 72a at the right end portion of the control valve 72. The two solenoid valves 73 and 74 are controlled by the control unit 19. The shift valve 71 comprises a first spool 76 biased to the right by a spring The second pilot line 82 branches into a line 94 connected to the pilot port 71b at the left end portion of the shift valve 71, and a line 95 connected to the pilot port 72b at the right end portion of the control valve 72, and the duty solenoid valve 74 is disposed at a drain line 96 that further branches from the line 95. When the duty ratio of the solenoid valve 74 is set at 0% (OFF), the drain line 96 is fully closed; when the duty ratio is set at 100% (ON), the drain line 96 is fully opened. At a duty ratio between these two duty ratios, the second pilot pressure according to the value of the duty ratio is generated in the second pilot line 82, and becomes lower as the duty ratio increases.

In the shift valve 71, the first and second spools 76 and 77 move to the right or left upon receiving the first and second pilot pressures and the contact pressure at the ports 71a and 71b at the two end portions and the intermediate port 71c, thereby switching the communication state between the release pressure port 71d and the port 71g or a drain port 71i, and also switching the communication state between the lockup pressure port 71e and the port 71h or port 71f.

On the other hand, in the control valve 72, the spool 79 moves to the right or left upon receiving the second and first pressures received at the ports 72a and 72b at the two end portions, thus switching the communication state between the port 72d and port 72c or a drain port 72e.

Note that a line 98 for supplying hydraulic oil in the torque converter 4 to the oil cooler 89 via a check valve 97 is arranged between the torque converter 4 and oil cooler 89.

The control unit 19 stores a lockup state characteristic map (FIG. 4) of the lockup clutch 36. The control unit 19 substitutes, in this characteristic map, the opening degree of the throttle valve 13 (throttle opening degree) detected by the throttle opening degree sensor 15, and the vehicle velocity calculated based on a signal pertaining to the rotational speed of the turbine shaft 37 sent from the turbine rotational speed sensor 17, a signal pertaining to the rotational speed of the output shaft of the transmission gear mechanism 5 sent from the output rotational speed sensor 18, or the like, and determines the lockup state of the lockup clutch 36 suitable for the current vehicle traveling conditions.

Figure 4:
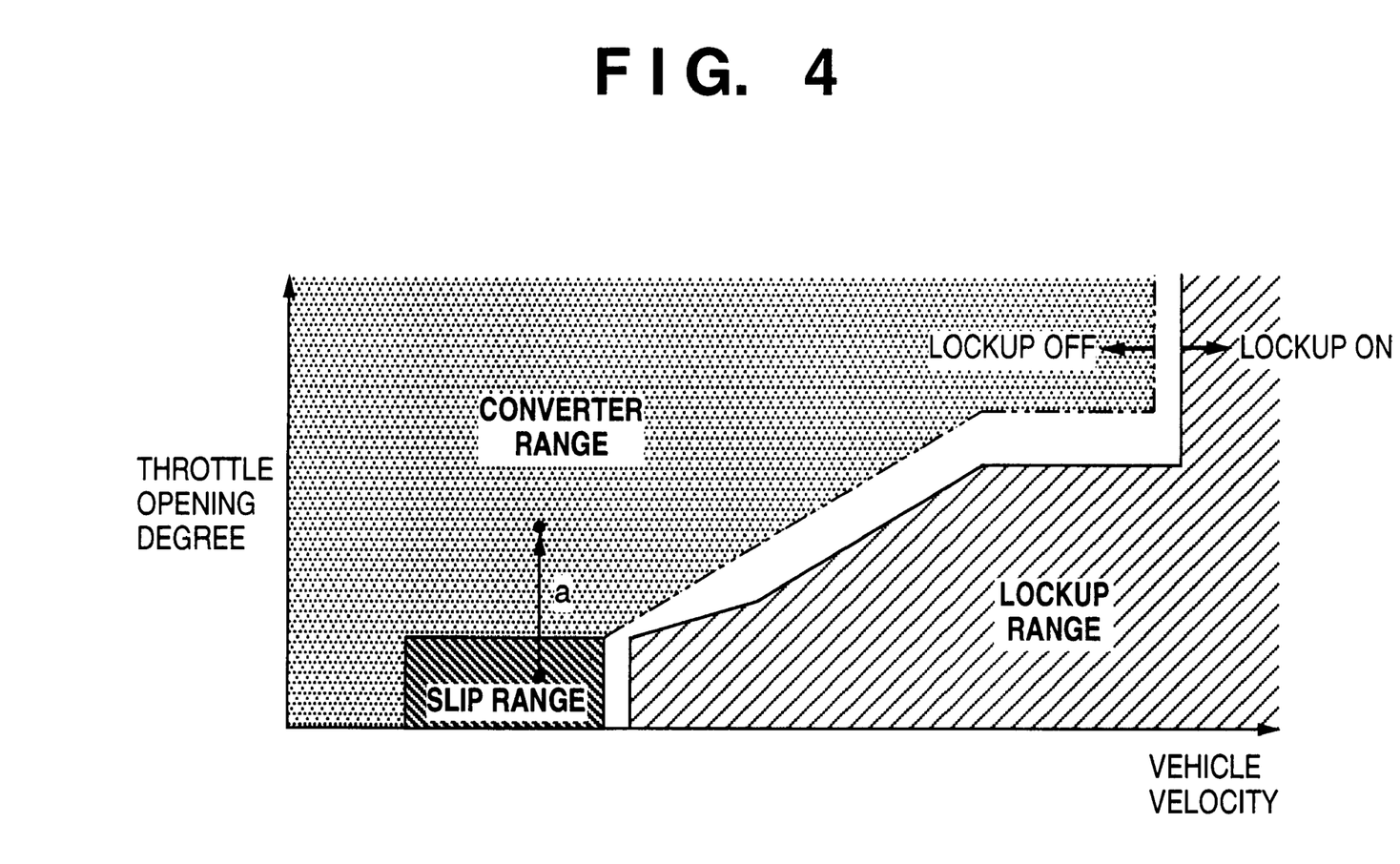
FIG. 4 is a graph sowing the lockup characteristics of the lockup clutch.

In this case, as shown in FIG. 4, in a high-load/low-vehicle velocity range that requires a torque-up effect of the torque converter 4, a shock absorption effect during transmission, and the like, the converter range is selected, and the lockup clutch 36 is fully released. In a low-load/high-speed range that does not so require the above effects, the lockup range is selected, and the lockup clutch 36 is fully locked up to improve mileage performance. Furthermore, in a low-load/low-vehicle velocity range, the slip range is selected, and the slip control for converting the slip amount of the lockup clutch 36 to a predetermined target slip amount is done, thus balancing between the torque-up effect, shock absorption effect, and the like, and the mileage and the like.

The lockup control of the lockup clutch 36 done by the control unit 19 will be explained below with reference to the flow chart in FIG. 5.

Figure 5:
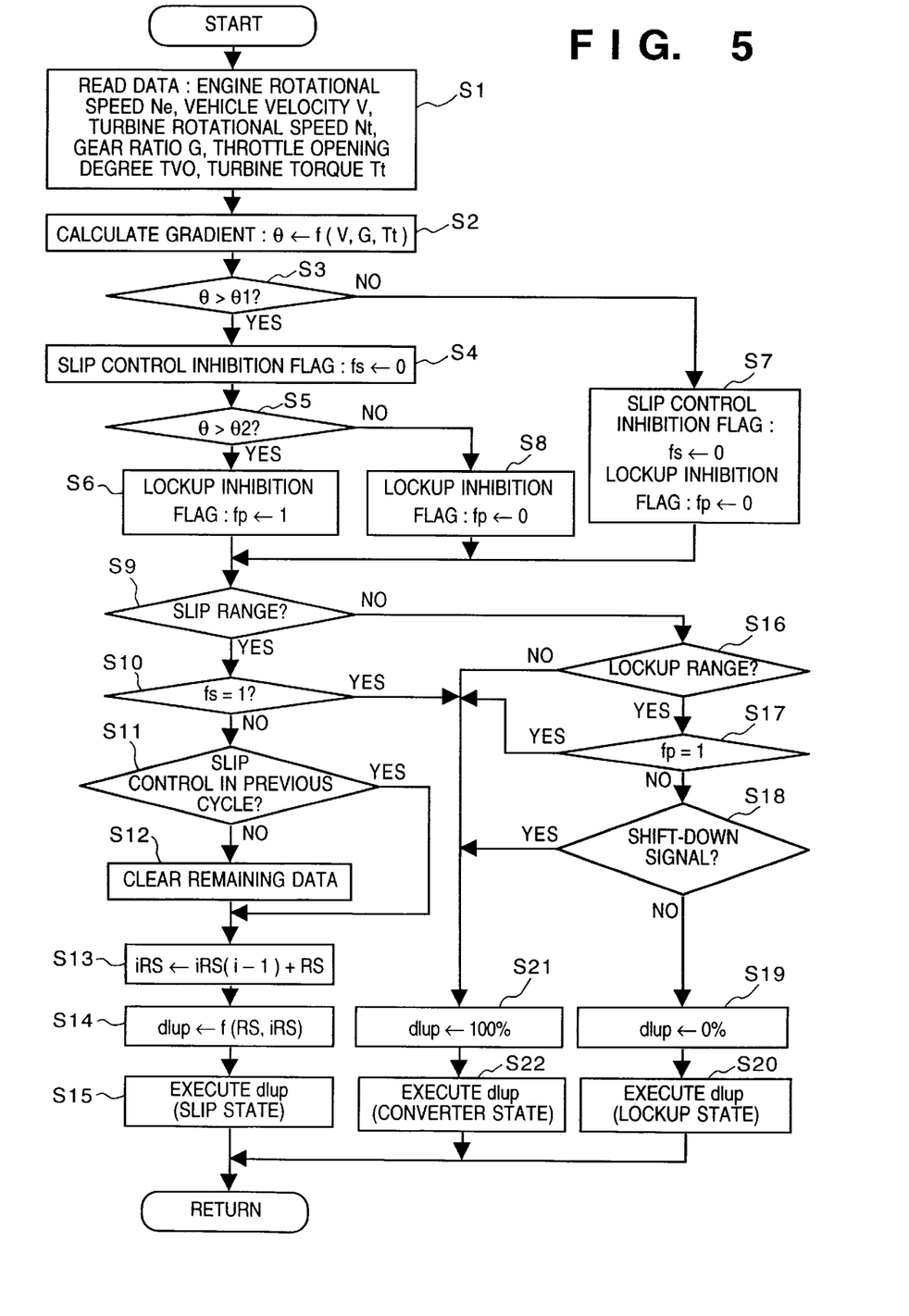
FIG. 5 is a flow chart showing the lockup control of the lockup clutch.

In FIG. 5, when the processing starts, various data are read in step S1. More specifically, the data to be read are an engine rotational speed (that of the output shaft 3a of the engine 3) Ne detected by the engine rotational speed sensor 16, a turbine rotational speed (that of the turbine shaft 37 of the torque converter 4) Nt detected by the turbine rotational speed sensor 17, a throttle opening degree TVO detected by the throttle opening degree sensor 15, a vehicle velocity V calculated based on the output shaft rotational speed of the transmission gear mechanism 5 detected by the output rotational speed sensor 18 or the turbine rotational speed NT, a gear ratio G calculated based on the turbine rotational speed Nt and output shaft rotational speed, a turbine torque Tt calculated based on the throttle opening degree TVO, engine rotational speed Ne, and turbine rotational speed Nt, and the like.

In step S2, a gradient value θ of the road surface the vehicle is traveling is calculated based on the gear ratio G and turbine torque Tt. The calculated value θ assumes a positive value when the road surface has an upward gradient; it assumes a negative value when the road surface has a downward gradient. Its absolute value becomes larger as the gradient becomes larger.

It is then checked in step S3 if the gradient value θ is larger than a predetermined value θ1. The predetermined value θ1 is a predetermined positive value. If YES in step S3, i.e., if the vehicle is traveling on an upward slope with a gradient larger than the predetermined value θ1, a flag fs that inhibits the slip control of the lockup clutch 36 is set at "1" in step S4.

It is checked in step S5 if the gradient value θ is larger than a second predetermined value θ2. The second predetermined value θ2 is a predetermined positive value larger than the first predetermined value θ1. If YES in step S5, i.e., if the vehicle is traveling on an upward slope with a gradient larger than the predetermined value θ2, a lockup inhibition flag fp that inhibits the lockup clutch 36 from being fully locked up is also set at "1" in step S6.

By contrast, if NO in step S3, i.e., if the vehicle is not traveling on an upward slope with a gradient larger than the first predetermined value θ1, the flow advances to step S7 to reset both the slip control inhibition flag fs and lockup inhibition flag fp to "0".

On the other hand, if NO in step S5, i.e., if the vehicle is traveling on an upward slope with a gradient larger than the first predetermined value θ1 but is not traveling on an upward slope with a gradient larger than the second predetermined value θ2, the flow advances to step S8 to reset the lockup inhibition flag fp to "0".

In step S9, the lockup state of the lockup clutch 36 is determined on the basis of the lockup state characteristic map of the lockup clutch 36 (FIG. 4), throttle opening degree TVO, and vehicle velocity V, and it is then checked if the slip range is consequently selected.

If it is determined in step S9 that the slip range is selected, it is checked in step S10 if the slip control inhibition flag fs is set. If NO in step S9, i.e., if the slip control is permitted, it is checked in step S11 if the slip control was done in the previous control cycle. If NO in step S11, i.e., if the slip control is to be started in the current control cycle, after all remaining data used in the past slip control are cleared in step S12, the flow advances to step S13. On the other hand, if YES in step S11, i.e., if the slip control was done in the previous control cycle, the flow jumps to step S13 without the above-mentioned processing.

In step S13, an integrated value iRS of a value RS obtained by executing blunt processing of a deviation RSo between an actual slip amount S of the lockup clutch 36 and a pre-set target slip amount So is calculated by:

$$iRS = iRS(i-1) + RS \tag{1}$$

where iRS(i−1) is the previous value of the integrated value iRS, and is set at "0" when the slip control is to be done for the first time.

The blunt-processed value RS is obtained by:

$$RS = RS(i-1) \times K + RSo \times (1-K) \tag{2}$$

where RS(i−1) is the previous value of the blunt-processed value RS, and is set at "0" when the slip control is to be done for the first time.

Also, a coefficient K is a blunt distribution coefficient, and is a predetermined value such as 0.95 which is larger than 0 and smaller than 1. Note that K may be set at "0" in only when the slip control is to be done for the first time.

The slip amount deviation RSo is calculated by:

$$RSo = S - So$$

$$= Ne - Nt - So \tag{3}$$

where Ne is the engine rotational speed, Nt is the turbine rotational speed, and So is the target slip amount, as described above.

In step S14, a duty ratio dlup of the duty solenoid valve 74 is calculated based on the blunt-processed value RS of the slip amount deviation RSo and its integrated value iRS. More specifically, the duty ratio dlup is calculated by so-called PID (Proportional Integral and Derivative control) using:

$$dlup = A \times iRS + B \times RS + C \times RS(i-1) \qquad (4)$$

where A, B, and C are predetermined coefficients used in PID.

In step S15, the duty solenoid value 74 is controlled at the calculated duty ratio dlup, and the ON/OFF solenoid valve 73 is set ON. With this control, as shown in FIG. 3, the first spool 76 of the shift valve 71 moves to the left and the second spool 77 moves to the right by the constant pressure supplied to the intermediate port 71c. As a result, the working pressure duty-controlled by the control valve 72 is supplied to the release pressure line 84 and release chamber 38 via the line 88 and shift valve 71, and is also supplied to the lockup pressure line 85 and lockup chamber 39 via the lines 80 and 86, and shift valve 71. With this pressure, the lockup force of the lockup clutch 36 is controlled in accordance with the duty ratio dlup, and the slip amount S of the clutch 36 is controlled to converge to the predetermined target slip amount So (the slip amount deviation RSo converges to 0).

On the other hand, if NO in step S9, the flow advances to step S16 to check if the lockup range is selected. If it is determined in step S16 that the lockup range is selected, it is checked in step S17 if the lockup inhibition flag fp is set at "1". If NO in step S17, i.e., if lockup control is permitted, after it is confirmed in step S18 that no shift-down signal is input, the duty ratio dlup of the duty solenoid value 74 is set at 0% in step S19.

Figure 6:
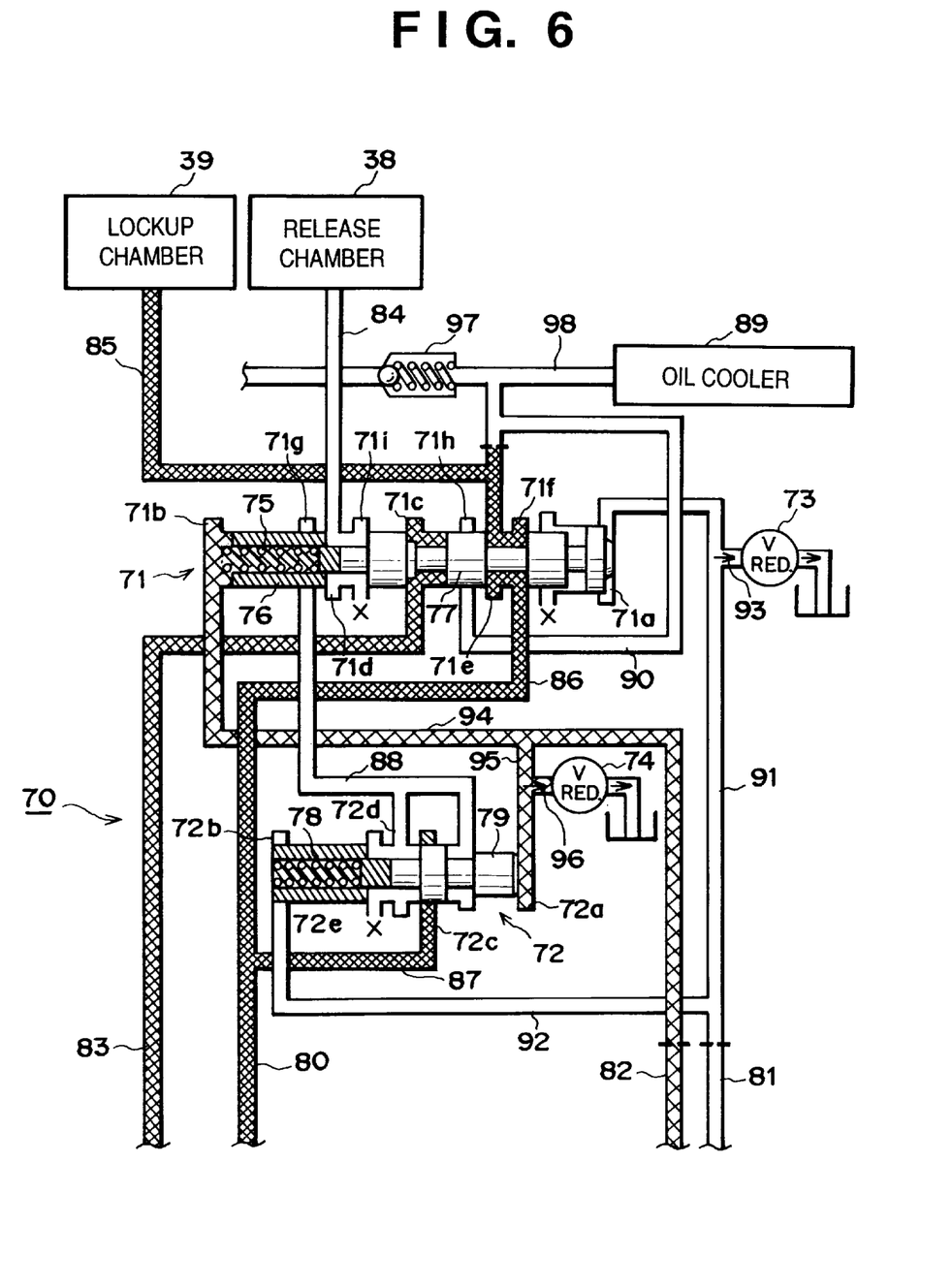
FIG. 6 is a diagram showing the hydraulic control circuit in the lockup state.

In step S20, the duty solenoid valve 74 is controlled at this duty ratio dlup=0%, and the ON/OFF solenoid valve 73 is set ON. With this control, both the first and second spools 76 and 77 of the shift valve 71 move to the right, and the spool 79 of the control valve 79 moves to the left, as shown in FIG. 6, thereby coupling the release pressure line 84 and release chamber 38 to the drain port 71i and supplying the working pressure to the lockup pressure line 85 and lockup chamber 39 via the lines 80 and 86, and shift valve 71. With this pressure, the lockup clutch 36 is fully locked up.

On the other hand, if NO in step S16, i.e., if the converter range is selected, the duty ratio dlup of the duty solenoid valve 74 is set at 100% in step S21.

Figure 7:
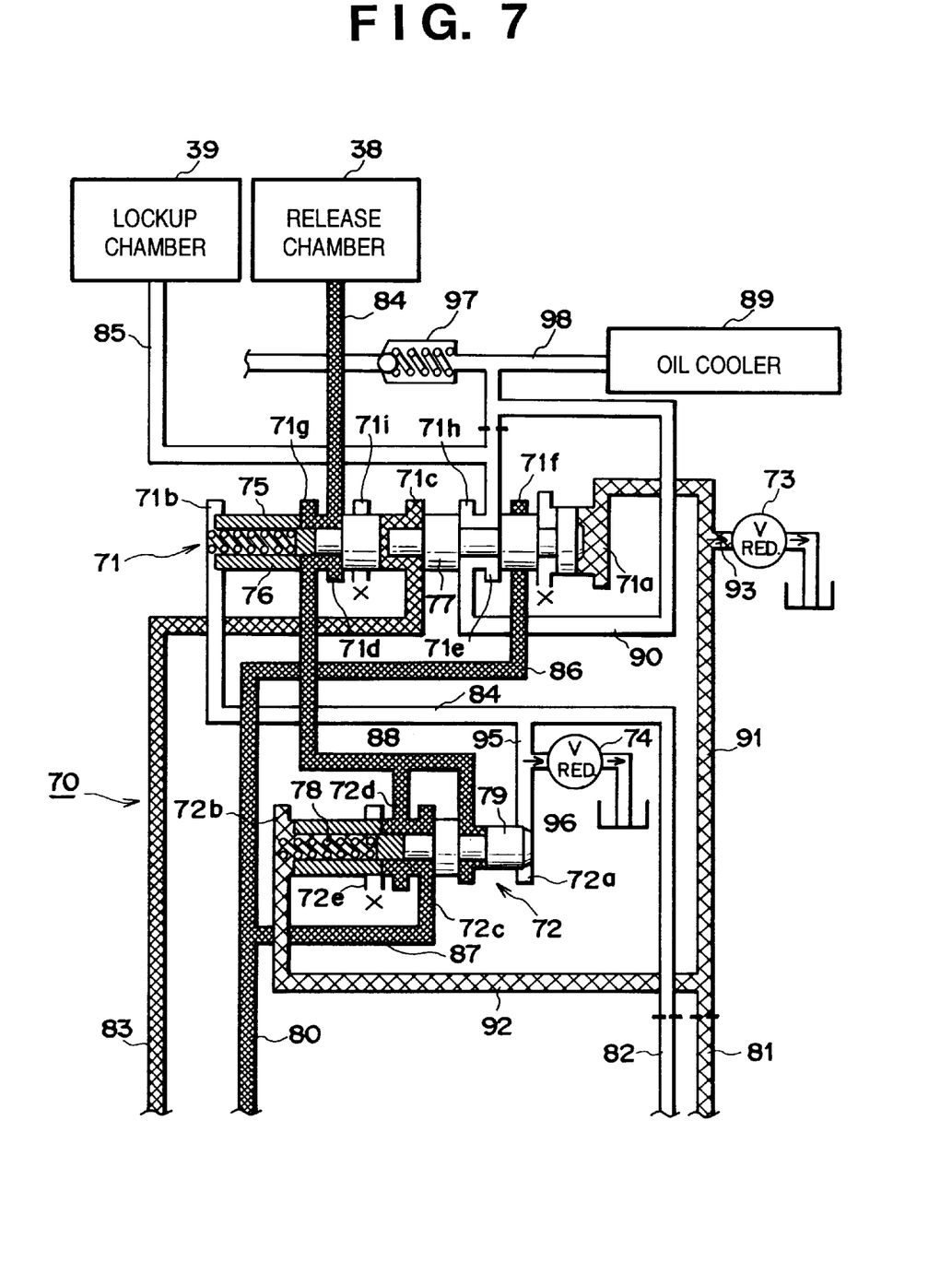
FIG. 7 is a diagram showing the hydraulic control circuit in the converter state.

In step S22, the duty solenoid valve 74 is controlled at this duty ratio dlup=100%, and the ON/OFF solenoid valve 73 is set OFF. With this control, both the first and second spools 76 and 77 of the shift valve 71 move to the left, and the spool 79 of the control valve 72 moves to the right, as shown in FIG. 7, thereby supplying the working pressure to the release pressure line 84 and release chamber 38 via the lines 80 and 87, control valve 72, line 88, and shift valve 71. Also, the lockup pressure line 85 is coupled to the oil cooler 89 via the lines 90 and 98, thus releasing the hydraulic pressure in the lockup chamber 39 to the oil cooler 89. In this way, the lockup clutch 36 is fully released.

If YES in step S10, S17, or S18, i.e., if the slip range is selected but the slip control inhibition flag fs is set at "1", if the lockup range is selected but lockup inhibition flag fp is set at "1", or if the lockup range is selected and the lockup inhibition flag fp is not set at "1" but a shift-down signal is detected, the control unit 19 inhibits the slip control or lockup control of the lockup clutch 36. After that, the flow advances to steps S21 and S22 to set the lockup clutch 36 in the converter state.

More specifically, when the vehicle is going up an upward slope with a gradient larger than the first predetermined value θ1 but is not going up an upward slope with a gradient larger than the second predetermined value θ2 larger than the first predetermined value θ1 (when the flow advances from step S5 to step S8), only the slip control inhibition flag fs is set at "1", and the lockup inhibition flag fp is reset to "0". In such case, only the slip control of the lockup clutch 36 is inhibited if the slip range is selected, or the lockup clutch 36 is kept locked up without being released if the lockup range is selected.

Therefore, the slip control for controlling the slip amount that has deviated from the target slip amount to converge to the target slip amount is inhibited while the vehicle is traveling on an upward slope. As a result, the driver is free from any unnatural feeling, i.e., can be prevented from repetitively feeling larger acceleration and deceleration than drive feeling that the driver has recognized in correspondence with his or her own acceleration pedal operation while the vehicle traveled on a flat road.

On the other hand, in the low-load/high-vehicle velocity range, i.e., in the lockup range in which a large torque-up effect cannot be expected, the lockup clutch 36 is kept in the lockup state without being released, thus maintaining the improvement effect of the mileage.

Furthermore, when the vehicle is going on an upward slope with the gradient larger than the second predetermined value θ2 (when the flow advances from step S5 to S6), since both the slip control inhibition flag fs and lockup inhibition flag fp are set at "1", the lockup clutch 36 is set in the converter state irrespective of the range determined on the basis of the characteristic map shown in FIG. 4.

Therefore, when the vehicle is traveling on a steeper upward slope, and a large torque-up effect can be obtained due to the large rotational speed difference between the pump 32 and turbine 33 of the clutch 36 obtained by releasing the lockup clutch 36, the clutch 36 is released even in the lockup range, and as a consequence, a good acceleration that can cope with the steep upward slope can be obtained.

Moreover, even when the vehicle is not traveling on an upward slope with a gradient larger than the second predetermined value θ2, and hence, the lockup inhibition flag fp is reset to "0" (when the flow advances from step S3 to step S7, or from step S5 to step S8), if the gear position has been shifted down, in other words, if the driver has pressed the accelerator pedal deeper, the lockup clutch 36 is released. With this control, the driver's acceleration request can be met.

As described above, according to this embodiment, when an upward gradient equal to or larger than the first predetermined value is detected, the lockup clutch is fully released irrespective of the lockup state of the lockup clutch.

Therefore, for example, when the vehicle has reached an upward slope during the slip control, since the slip control is interrupted, the slip amount of the lockup clutch that has deviated from the target slip amount is not controlled to converge to the target slip amount. As a result, the driver can be prevented from repetitively feeling larger acceleration and deceleration than those the driver expected.

In this case, when the converter state is set by releasing the lockup clutch, a torque-up effect can be obtained, and acceleration that can cope with the upward gradient can be obtained.

On the other hand, when the vehicle has reached an upward slope in the lockup state, the lockup clutch is not released but is kept in the lockup state. Hence, the improvement effect of the mileage can be maintained.

Furthermore, when the driver has pressed the accelerator pedal and the gear position has been shifted down, or when an upward gradient equal to or larger than the second value larger than the first value is detected, the lockup clutch is released. With this control, a torque-up effect that can meet the driver's acceleration request can be obtained.

The present invention is not limited to the above embodiments and various changes and modifications can be made within the spirit and scope of the present invention. Therefore, to apprise the public of the scope of the present invention the following claims are made.

What is claimed is:

1. A lockup force control apparatus for a fluid coupling of a vehicle with an automatic transmission, which comprises:

a fluid coupling having an input element for receiving engine rotation, an output element which is rotated using fluid as a medium upon rotation of the input element, and which transmits the rotation of the input element to a transmission gear mechanism, and a friction element which can lock up the input and output elements;

adjustment means for adjusting a lockup force of the friction element of said fluid coupling;

traveling condition detection means for detecting a traveling condition of a vehicle;

lockup state selection means for selecting a lockup state of the friction element from a full lockup state, slip state, and release state on the basis of a lockup state characteristic of the friction element, which is set in advance in accordance with the traveling condition, and the detection result of said traveling condition detection means; and control means for controlling said adjustment means to realize the lockup state of the friction element selected by said lockup state selection means, said apparatus further comprising:

road gradient detection means for detecting a gradient of a road the vehicle is traveling; and lockup state change means for, when said road gradient detection means detects an upward gradient not less than a first predetermined value, controlling said control means to release the friction element in the slip state and to operate the friction element in the full lockup state on the basis of the lockup state characteristic of the friction element irrespective of the selection result of said lockup state selection means.

2. The apparatus according to claim 1, wherein even when said lockup state selection means has selected the full lockup state as the lockup state of the friction element, when a gear position of said transmission gear mechanism is shifted down upon depression of an accelerator pedal by a driver, said lockup state change means controls said control means to set the friction element in the release state.

3. The apparatus according to claim 1, wherein even when said lockup state selection means has selected the full lockup state as the lockup state of the friction element, when said road gradient detection means detects an upward gradient not less than a second predetermined value larger than the first predetermined value, said lockup state change means controls said control means to set the friction element in the release state.

4. A lockup force control apparatus for a fluid coupling of a vehicle with an automatic transmission, comprising:

a torque converter comprising a pump coupled to an output shaft of an engine, and a turbine coupled to an input shaft of a transmission gear mechanism;

a lockup clutch which can lock up said pump and turbine;

a release chamber which is adapted to release said lockup clutch upon reception of hydraulic oil;

a lockup chamber which is adapted to lock up said lockup clutch upon reception of hydraulic oil;

a solenoid valve for adjusting the hydraulic oil to be supplied to said release and lockup chambers;

an engine rotational speed sensor for detecting a rotational speed of the engine;

a throttle opening degree sensor for detecting a throttle opening degree of the engine;

a turbine rotational speed sensor for detecting a rotational speed of the input shaft of the transmission gear mechanism;

an output shaft rotational speed sensor for detecting a rotational speed of an output shaft of the transmission gear mechanism; and a control unit for controlling said solenoid valve using detection signals supplied from said engine rotational speed sensor, throttle opening degree sensor, turbine rotational speed sensor, and output shaft rotational speed sensor, wherein said control unit has a lockup state characteristic map of said lockup clutch using a vehicle velocity and the throttle opening degree as parameters, controls said solenoid valve to realize a lockup state of said lockup clutch from a full lockup state, slip state, and release state determined on the basis of the characteristic map, the vehicle velocity calculated based on a detection value of said turbine rotational speed sensor, and a detection value of said throttle opening degree sensor, calculates a gradient of a road the vehicle is traveling on the basis of a turbine torque calculated based on the engine rotational speed, throttle opening degree, and turbine rotational speed, a gear ratio calculated based on the turbine rotational speed and output shaft rotational speed, and the vehicle velocity calculated based on the output shaft rotational speed, and controls said solenoid valve to release said lockup clutch in the slip state and to operate said lockup clutch in the full lockup state by on and off duty signals on the basis of the characteristic map irrespective of the lockup state determined by the characteristic map when a gradient of the road the vehicle is traveling is an upward gradient not less than a first predetermined value.

5. The apparatus according to claim 4, wherein even when the full lockup state is selected as the lockup state of the lockup clutch, when a gear position of said transmission gear mechanism is shifted down upon depression of an accelerator pedal by a driver, said control unit controls said solenoid valve to set the lockup clutch in the release state.

6. The apparatus according to claim 4, wherein even when the full lockup state is selected as the lockup state of the lockup clutch, when it is detected that an upward gradient is not less than a second predetermined value larger than the first predetermined value, said control unit controls said solenoid valve to set the lockup clutch in the release state.

* * * * *

UNITED STATES PATENT AND TRADEMARK OFFICE
CERTIFICATE OF CORRECTION

PATENT NO.: 5,976,055
DATED : November 2, 1999
INVENTOR(S): Kazuo Sasaki

It is certified that error appears in the above-identified patent and that said Letters Patent is hereby corrected as shown below:

Column 1, line 39, change "pre-stores" to --prestores--;

Column 3, line 47, after "lockup" delete ".";

Column 7, line 7, after "42" insert a paragraph.

Signed and Sealed this

Twenty-third Day of May, 2000

Attest:

Q. TODD DICKINSON

Attesting Officer

Director of Patents and Trademarks